United States Patent
Vincent et al.

(10) Patent No.: US 10,826,080 B2
(45) Date of Patent: Nov. 3, 2020

(54) FUEL CELL COMPRISING A MEMBRANE/ELECTRODE ASSEMBLY PROVIDED WITH A CAPACITIVE LAYER

(71) Applicant: COMMISSARIAT A L'ENERGIE ATOMIQUE ET AUX ENERGIES ALTERNATIVES, Paris (FR)

(72) Inventors: Remi Vincent, Grenoble (FR); Marco Bolloli, Grenoble (FR); Benjamin Decoopman, Neuve-Chapelle (FR); Sebastien Rosini, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 131 days.

(21) Appl. No.: 16/315,085

(22) PCT Filed: Jul. 3, 2017

(86) PCT No.: PCT/FR2017/051805
§ 371 (c)(1),
(2) Date: Jan. 3, 2019

(87) PCT Pub. No.: WO2018/007743
PCT Pub. Date: Jan. 11, 2018

(65) Prior Publication Data
US 2019/0312285 A1   Oct. 10, 2019

(30) Foreign Application Priority Data
Jul. 6, 2016   (FR) .................... 16 56468

(51) Int. Cl.
*H01M 8/0228*   (2016.01)
*H01M 4/88*   (2006.01)
(Continued)

(52) U.S. Cl.
CPC ....... *H01M 8/0228* (2013.01); *H01M 4/8807* (2013.01); *H01M 8/0226* (2013.01);
(Continued)

(58) Field of Classification Search
CPC ............. H01M 8/0228; H01M 8/0243; H01M 8/0226; H01M 8/0258; H01M 8/1004;
(Continued)

(56) References Cited

U.S. PATENT DOCUMENTS

| 2007/0148517 A1 | 6/2007 | Merlo et al. |
| 2007/0202383 A1* | 8/2007 | Goebel ............... H01M 8/1007 429/444 |

(Continued)

FOREIGN PATENT DOCUMENTS

| EP | 1 806 803 A2 | 7/2007 |
| EP | 1 986 258 A1 | 10/2008 |
| EP | 2 704 241 A1 | 3/2014 |

OTHER PUBLICATIONS

International Search Report dated Oct. 23, 2017 in PCT/FR2017/051805 filed on Jul. 3, 2017.

*Primary Examiner* — Ula C Ruddock
*Assistant Examiner* — Matthew W Van Oudenaren
(74) *Attorney, Agent, or Firm* — Oblon, McClelland, Maier & Neustadt, L.L.P.

(57) ABSTRACT

A fuel cell including: a membrane/electrode assembly including a proton exchange membrane and including an anode in contact with the membrane, the membrane/electrode assembly including a first active zone covered by the anode, and a first linking zone not covered by the anode; flow guiding plates between which the membrane/electrode assembly is arranged, the flow guiding plates being traversed by at least one first flow collector in communication with the anode, the first linking zone arranged between the
(Continued)

first flow collector and the first active zone. The membrane/electrode assembly further includes a first capacitive layer including a mixture of carbon including a BET specific surface area at least equal to 200 m$^2$/g and of a proton-conducting material, arranged on the first linking zone.

12 Claims, 5 Drawing Sheets

(51) Int. Cl.

| | | |
|---|---|---|
| *H01M 8/0226* | (2016.01) | |
| *H01M 8/0258* | (2016.01) | |
| *H01M 8/1004* | (2016.01) | |
| *H01M 8/0243* | (2016.01) | |
| *H01M 8/1018* | (2016.01) | |
| *H01M 4/90* | (2006.01) | |
| *H01M 4/86* | (2006.01) | |

(52) U.S. Cl.
CPC ....... *H01M 8/0243* (2013.01); *H01M 8/0258* (2013.01); *H01M 8/1004* (2013.01); *H01M 4/8657* (2013.01); *H01M 4/9058* (2013.01); *H01M 2008/1095* (2013.01)

(58) Field of Classification Search
CPC ............. H01M 4/8807; H01M 4/9058; H01M 4/8657; H01M 2008/1095
See application file for complete search history.

(56) References Cited

U.S. PATENT DOCUMENTS

| | | | |
|---|---|---|---|
| 2008/0118788 A1* | 5/2008 | Cartwright | ........ H01M 8/04268 429/429 |
| 2009/0011322 A1 | 1/2009 | Gemba et al. | |
| 2011/0311897 A1 | 12/2011 | Kato | |
| 2014/0065519 A1 | 3/2014 | Vincent et al. | |

* cited by examiner

FUEL CELL COMPRISING A MEMBRANE/ELECTRODE ASSEMBLY PROVIDED WITH A CAPACITIVE LAYER

The invention relates to fuel cells, and more particularly fuel cells including bipolar plates between which a membrane/electrode assembly with proton exchange membrane is arranged.

Fuel cells are notably envisaged as an energy source for motor vehicles produced on a large scale in the future or as auxiliary energy sources in aeronautics. A fuel cell is an electrochemical device that converts chemical energy directly into electrical energy. A fuel cell comprises a stack of several cells in series. Each cell typically generates a voltage of the order of 1 V, and stacking them makes it possible to generate a supply voltage of a higher level, for example of the order of a hundred volts.

Among the known types of fuel cells, we may notably mention the proton exchange membrane (PEM) fuel cell, operating at low temperature. Fuel cells of this kind have particularly advantageous properties of compactness. Each cell comprises an electrolytic membrane only allowing protons to pass, and not electrons. The membrane comprises an anode on a first face and a cathode on a second face to form a membrane/electrode assembly (MEA). The membrane generally comprises, at its periphery, two reinforcements fixed on the respective faces of this membrane.

At the anode, dihydrogen used as fuel is ionized to produce protons that pass through the membrane. The membrane thus forms an ion conductor. The electrons produced by this reaction migrate to a flow plate, and then pass through an electric circuit outside the cell to form an electric current. At the cathode, oxygen is reduced and reacts with the protons to form water.

The fuel cell may comprise several so-called bipolar plates, for example made of metal, stacked on top of one another. The membrane is arranged between two bipolar plates. The bipolar plates may comprise flow channels and holes for continuously guiding the reactants and the products to/from the membrane. The bipolar plates also comprise flow channels for guiding liquid coolant that removes the heat produced. The reaction products and the unreactive species are evacuated by entrainment by the flow to the outlet of the networks of flow channels. The flow channels of the various flows are separated notably by the bipolar plates. The bipolar plates are also electrically conducting for collecting electrons generated at the anode. The bipolar plates also have a mechanical function of transmitting the forces clamping the stack, which is necessary for the quality of electrical contact. Electron conduction takes place through the bipolar plates, ionic conduction being obtained through the membrane. Gas diffusion layers are interposed between the electrodes and the bipolar plates and are in contact with the bipolar plates.

Some designs of bipolar plates use homogenization zones for connecting inlet and outlet collectors to the various flow channels of the bipolar plates. Such homogenization zones generally lack electrodes. The reactants are brought into contact with the electrodes from inlet collectors and the products are evacuated from outlet collectors connected to the various flow channels. The inlet collectors and the outlet collectors generally pass through the full thickness of the stack.

Fuel cells are generally limited by a maximum operating current that they can supply to an electrical load. This maximum current is a parameter in the dimensioning of the fuel cell. This parameter thus has an influence on the overall dimensions, weight and cost of the fuel cell. Depending on the use of the fuel cell, management of transient peaks of current surges may thus require excessive dimensioning relative to the average usage current of the fuel cell.

Moreover, certain phenomena may lead to degradation of the performance of the fuel cell during its operation or owing to irreversible degradation of materials forming the cathode. Stop/start cycles are in particular a source of degradation of the membrane/electrode assembly (MEA). Injection of hydrogen on starting combined with presence of air at the anode induces division into an active zone and a passive zone. Operation is normal in the active zone. Inverse currents are however generated in the passive part, which causes corrosion of a support material of the cathode, especially when it is of carbon nanomaterial. A similar phenomenon occurs on stopping, more particularly if oxygen or air is injected into the fuel cell.

To overcome some of these problems, document U.S. Pat. No. 604,848 proposed including a capacitance in the fuel cell, so as notably to be able to supply a transient peak current, or to be able to supply a current if there is shortage of fuel. This document describes including a combination of specific materials on the electrodes of the MEA. A hydrophobic material allows passage of the gas and is combined with a hydrophilic material making it possible to ensure transport of water.

However, the catalyst loading is normally higher at the cathode level than at the anode level: the reaction of oxygen reduction at the cathode is in fact more difficult to perform than the hydrogen oxidation reaction at the anode. There is then a tendency to have a cathode capacitance higher than the anode capacitance.

During discharge of the capacitances, the charges present at one electrode are transferred to the other electrode. The capacitances must therefore be identical at the anode and at the cathode to optimize the use of these capacitances. To balance the capacitances at the anode and at the cathode, it is then necessary to increase the capacitance at the anode, for example by increasing the thickness of its layer combining the hydrophilic material and the hydrophobic material. However, such a layer causes electrical losses through increase in contact resistance.

Document US 2011/0311897 describes a fuel cell structure with a membrane/electrode assembly having a linking zone with a hydrophobic gas diffusion layer made of PTFE. With a higher catalyst loading at the cathode compared to the anode, it is necessary to increase the thickness of the cathode in order to balance the capacitance of the anode and of the cathode. Such an increase in the thickness leads to electrical losses through increase in contact resistance.

The invention aims to solve one or more of these drawbacks. The invention thus relates to a fuel cell, as defined in attached claim 1.

The invention also relates to the variants defined in the dependent claims. A person skilled in the art will understand that each of the features of the variants of the dependent claims may be combined independently with the features of claim 1, but without constituting an intermediate generalization.

Other features and advantages of the invention will become clearer from the description thereof given hereunder, as a guide and in an entirely non-limiting manner, referring to the appended drawings, in which.

Figure 1:
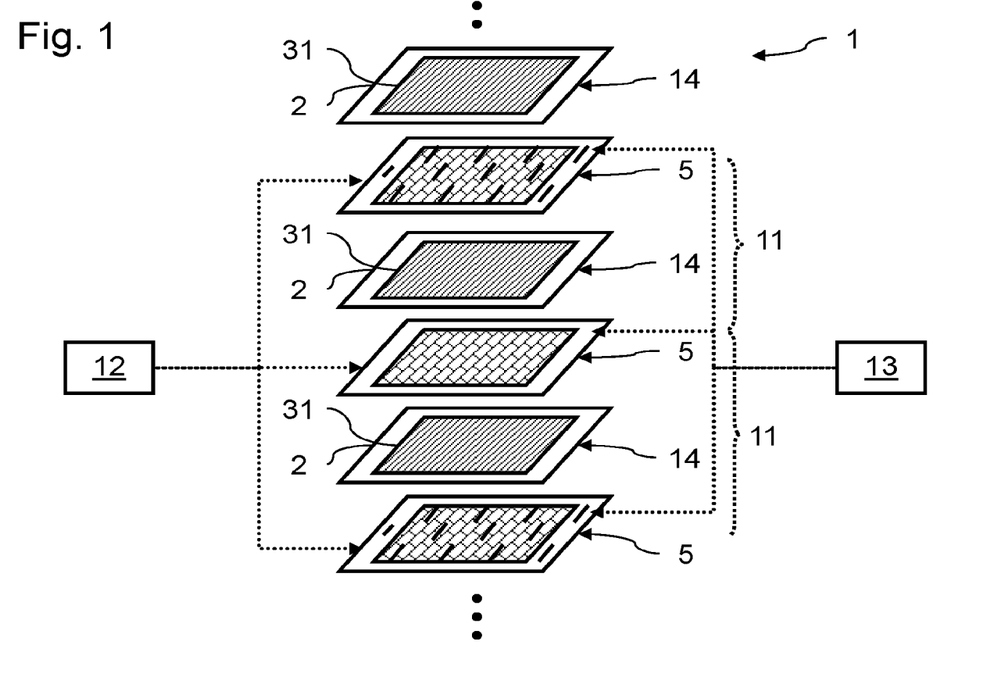
FIG. 1 is an exploded perspective view of an example of a stack of membrane/electrode assemblies and bipolar plates for a fuel cell.

FIG. 1 is a schematic exploded perspective view of a stack of cells 11 of a fuel cell 1. The fuel cell 1 comprises several superposed cells 11. The cells 11 are of the proton exchange membrane or polymer electrolyte membrane type.

The fuel cell 1 comprises a fuel source 12. The fuel source 12 supplies an inlet of each cell 11 with dihydrogen in this case. The fuel cell 1 also comprises a source of combustive 13. The source of combustive 13 in this case supplies air to an inlet of each cell 11, the oxygen of the air being used as oxidant. Each cell 11 also comprises exhaust channels. One or more cells 11 also have a cooling circuit.

Each cell 11 comprises a membrane/electrode assembly 14 or MEA 14. A membrane/electrode assembly 14 comprises an electrolyte 2, an anode 31 and a cathode (not illustrated) placed on either side of the electrolyte and fixed on this electrolyte 2. The layer of electrolyte 2 forms a semipermeable membrane allowing proton conduction while being impermeable to the gases present in the cell. The layer of electrolyte also prevents passage of the electrons between the anode 31 and the cathode.

A bipolar plate 5 is arranged between each pair of adjacent MEAs. Each bipolar plate 5 defines anode flow channels and cathode flow channels. Bipolar plates also define flow channels for liquid coolant between two successive membrane/electrode assemblies.

In a manner known per se, during operation of the fuel cell 1, air flows between an MEA and a bipolar plate 5, and dihydrogen flows between this MEA and another bipolar plate 5. At the anode, dihydrogen is ionized to produce protons, which pass through the MEA. The electrons produced by this reaction are collected by a bipolar plate 5. The electrons produced are then applied to an electrical load connected to the fuel cell 1 to form an electric current. At the cathode, oxygen is reduced and reacts with the protons to form water. The reactions at the anode and the cathode are written as follows:

$H_2 \rightarrow 2H^+ + 2e^-$ at the anode;

$4H^+ + 4e^- + O_2 \rightarrow 2H_2O$ at the cathode.

During its operation, a cell of the fuel cell usually generates a DC voltage between the anode and the cathode of the order of 1V.

Figure 2:
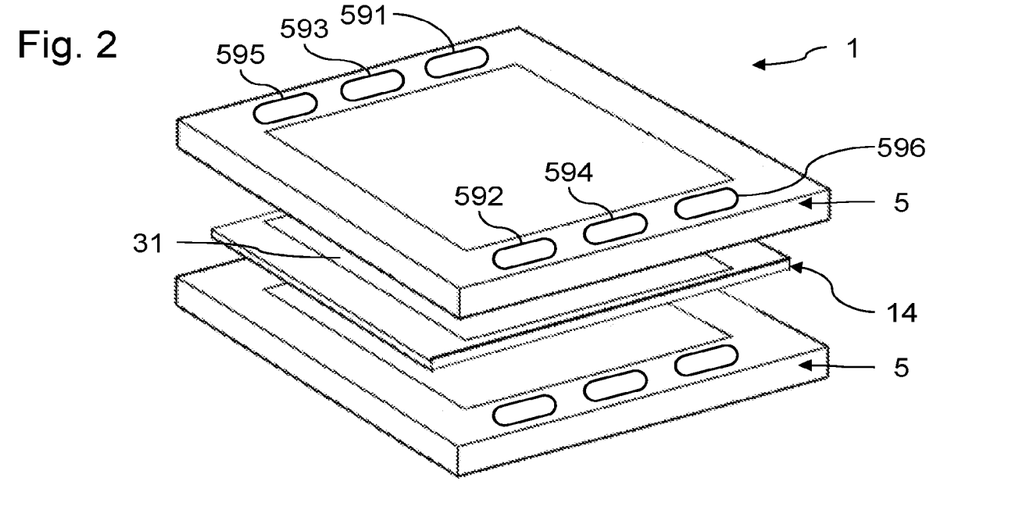
FIG. 2 is an exploded perspective view of bipolar plates and of a membrane/electrode assembly intended to be stacked to form flow collectors through the stack.

FIG. 2 is a schematic exploded perspective view of two bipolar plates 5 and of a membrane/electrode assembly intended to be included in the stack of the fuel cell 1. The stack of the bipolar plates 5 and membrane/electrode assemblies 14 is intended to form a plurality of flow collectors, the arrangement of which is only illustrated schematically here. For this purpose, respective holes are made through the bipolar plates 5 and through the membrane/electrode assemblies 14. The MEAs 14 comprise reinforcements (not illustrated) at their periphery.

The bipolar plates 5 thus comprise holes 591, 593 and 595 at a first end, and holes 592, 594 and 596 at a second end opposite the first. Hole 591 serves for example to form a fuel supply collector, hole 592 serves for example to form a collector for evacuating combustion residues, hole 594 serves for example to form a collector for supplying liquid coolant, hole 593 serves for example to form a collector for evacuating liquid coolant, hole 596 serves for example to form a collector for supplying combustive, and hole 595 serves for example to form a collector for evacuating reaction water.

The holes in the bipolar plates 5 and in the membrane/electrode assemblies 14 (i.e. the holes made in the reinforcements, which are not illustrated) are arranged facing one another in order to form the various flow collectors.

Figure 3:
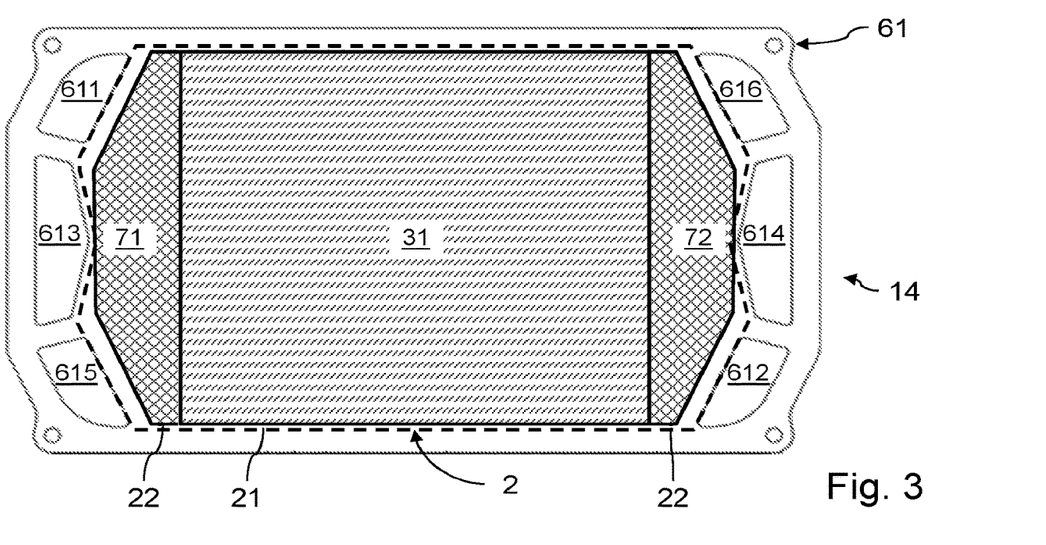
FIGS. 3 and 4 are top views of a membrane/electrode assembly according to an embodiment example of the invention.
Figure 4:
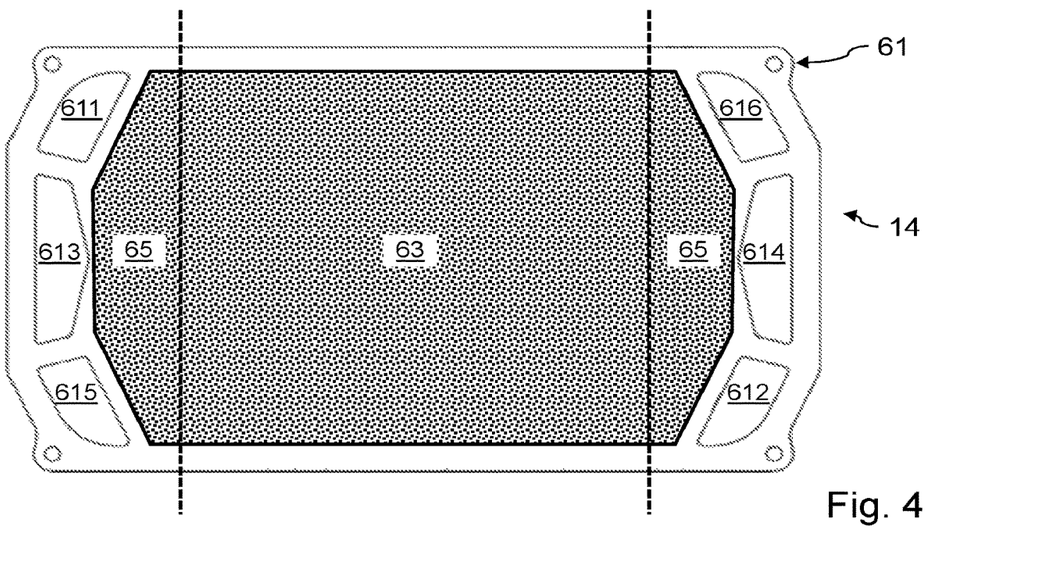
Figure 5:
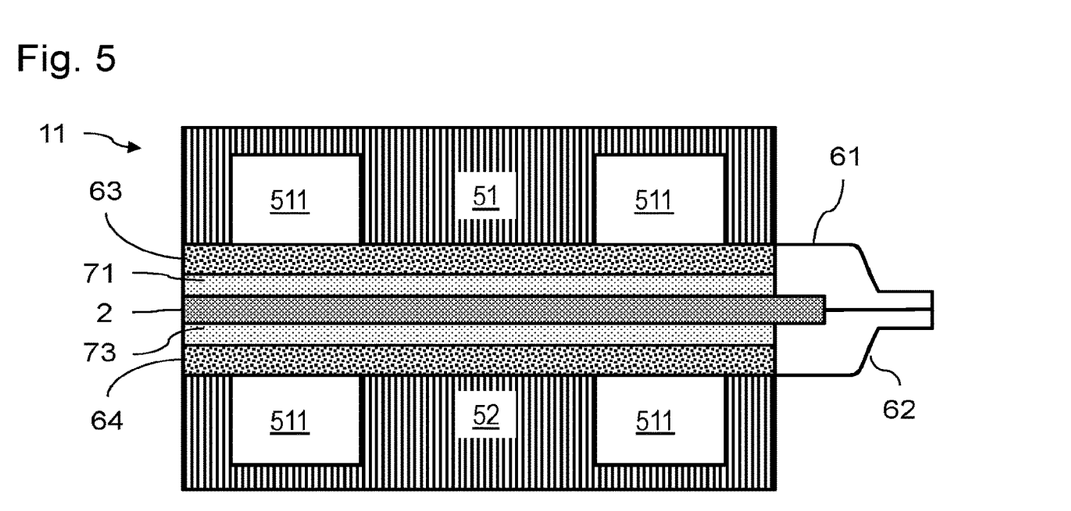
FIG. 5 is a cross-sectional view of a fuel cell including a membrane/electrode assembly according to FIG. 3.

FIG. 3 is a top view of a membrane/electrode assembly 14 according to an embodiment example of the invention in the absence of a gas diffusion layer. FIG. 4 is a top view of the membrane/electrode assembly 14 in FIG. 3, provided with a gas diffusion layer 63. FIG. 5 is a sectional view of a cell 11 of a fuel cell, including such a membrane/electrode assembly 14, at the level of a lateral edge of a linking zone.

The membrane/electrode assembly 14 includes the membrane 2, an anode 31 and a cathode (not illustrated) integrated on either side of the membrane 2. The composition and the structure of the anode 31 and of the cathode are known per se to a person skilled in the art and will not be described in more detail. The membrane/electrode assembly 14 additionally includes reinforcements 61 and 62. The reinforcements 61 and 62 are fixed at the periphery of respective faces of the membrane 2.

Reinforcement 61 elsewhere comprises holes 611, 613 and 615 made alongside a median opening, without a reference number. The holes 611, 613 and 615 are intended to be positioned facing the holes 591, 593 and 595 of the bipolar plates 51 and 52, detailed later. Reinforcement 61 comprises holes 612, 614 and 616 made opposite holes 611, 613 and 615, relative to the median opening. Holes 612, 614 and 616 are intended to be positioned facing holes 592, 594 and 596 of the bipolar plates 51 and 52.

A gas diffusion layer 63 is in contact with the anode 31 through a median hole made through reinforcement 61. A lower gas diffusion layer (not illustrated) is in contact with the cathode through a median hole made through reinforcement 62.

Anode 31 defines an active zone 21 in which the anodic electrochemical reaction takes place. A bipolar plate 51 is opposite the gas diffusion layer 63 and comprises flow channels 511 for guiding fuel such as dihydrogen to the active zone 21. The collector 591 is thus in communication with other flow channels of the bipolar plate 51, made in the active zone. A linking zone or homogenization zone 22 is provided between the active zone 21 and the flow collectors 592, 594 and 596. Another linking zone or homogenization zone 22 is provided between the active zone 21 and the flow collectors 591, 593 and 595. One linking zone 22 is intended in a manner known per se to homogenize the flow of fuel between collector 591 and the anode flow channels, the other linking zone 22 being intended to homogenize the anodic outlet flow. The linking zones 22 begin at the level of the longitudinal ends of the anode 31.

Another bipolar plate 52 is opposite the gas diffusion layer 64 and comprises flow channels for guiding a combustive such as air to the cathode active zone. The cathode defines an active zone in which the cathodic electrochemical reaction takes place. A linking zone or homogenization zone 24 is provided between the cathode active zone and the flow collectors 592, 594 and 596, another linking zone 24 being provided between the cathode active zone and the flow collectors 591, 593 and 595. One linking zone 24 is intended in a manner known per se to homogenize the flow of combustive between the cathode flow channels and the collector 596. The other linking zone 24 is intended in a manner known per se to homogenize the flow between the cathode flow channels and the outlet collector 595.

For simplicity, the (optional) flow channels of liquid coolant through the bipolar plates 51 and 52 are not illustrated.

The membrane/electrode assembly 14 further comprises a capacitive layer 71 on a linking zone 22, and a capacitive layer 72 on another linking zone 22. Advantageously, the capacitive layers 71 and 72 occupy the major part of the surface of their respective linking zone 22, in order to optimize the integrated capacitance in the fuel cell 1.

The capacitive layers 71 and 72 are in electrical contact with the bipolar plate 51, so as to be able to discharge/recharge as needed. For an optimal capacitance, the capacitive layers 71 and 72 include a mixture of carbon having a BET specific surface area at least equal to 200 $m^2/g$ and a proton-conducting material, advantageously at least equal to 500 $m^2/g$, or even at least equal to 700 $m^2/g$. Such a carbon has a high specific surface area so as to be able to store a maximum of charges. The proton-conducting material is intended to promote transport of protons to the sites for storage of the charges in the carbon.

Implantation of a capacitive layer on an anodic linking zone of the membrane 14 makes it possible to produce this capacitive layer without compromising the structure and the performance of the anode 31.

The carbon of the mixture may be for example carbon black distributed under the trade reference Ketjenblack CJ300 by the company Lion Specialty Chemicals, or the carbon black distributed under the trade reference Acetylene Black AB50X GRIT by the company Chevron Phillips Chemical.

The proton conductor of the mixture may be for example a proton-conducting binder, for example PFSA as marketed under the trade references Nafion, Aquivion or Flemion, PEEK, or polyamine.

The mixture of the capacitive layers 71 and 72 advantageously has a proportion by weight of this carbon at least equal to 40%, preferably at least equal to 55%. Advantageously the proportion by weight of this carbon is at most equal to 80%, or even at most equal to 65%. The mixture of the capacitive layers 71 and 72 advantageously has a proportion by weight of the proton conductor at least equal to 20%, preferably at least equal to 35%. Advantageously the proportion by weight of the proton conductor is at most equal to 60%, or even at most equal to 45%.

In the example illustrated, the gas diffusion layer 63 comprises portions 65 overflowing longitudinally on either side relative to the reactive zone 21. These portions 65 cover the capacitive layer 71 and the capacitive layer 72, respectively.

The capacitive layers 71 and 72 advantageously have a thickness of between 10 and 50 nm in the configuration illustrated in FIGS. 3 to 5.

The capacitive layers 71 and 72 will advantageously be dimensioned to have a surface capacitance at least equal to 600 $mF/cm^2$.

The capacitive layers 71 and 72 are advantageously free from catalyst material, for example free from any catalyst material present in the anode 31.

Here, the membrane/electrode assembly 14 further comprises a capacitive layer 73 on the linking zone 24. Advantageously, another capacitive layer covers another linking zone produced on the membrane 2, disposed opposite to the linking zone 24 relative to the cathode.

Advantageously, these capacitive layers of the cathodic side occupy the major part of the surface of their respective linking zone, in order to optimize the integrated capacitance in the fuel cell 1.

In order to have a good balance of the capacitive layers of the anodic side and cathodic side, the capacitive layers of the cathodic side advantageously have the same composition, the same thickness, and/or the same geometry as the capacitive layers on the anodic side. The anodic capacitive layers and the cathodic capacitive layers are superposed here.

The electrode 31 and/or the capacitive layers 71 and 72 may be produced by applying inks to the membrane 2, for example by coating, screen printing or spraying.

Figure 6:
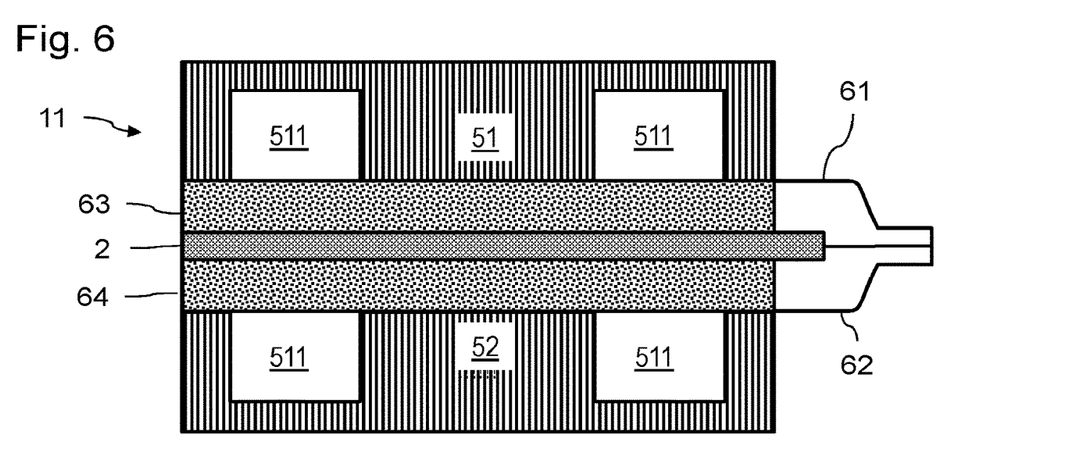
FIG. 6 is a cross-sectional view of a fuel cell including a variant of membrane/electrode assembly.

FIG. 6 is a sectional view of a cell 11 of a fuel cell, including a variant of membrane/electrode assembly 14, at the level of a lateral edge of a linking zone. The membrane/electrode assembly 14 includes the same structure of membrane 2, of anode and of cathode, of reinforcements 61 and 62 and of bipolar plates 51 and 52 as in the variant in FIG. 3. In this variant, the gas diffusion layers 63 and 64 have the same geometry as in the variant in FIG. 3. The mixture of carbon and of proton conductor is included here in the parts of the gas diffusion layers 63 and 64 that cover the linking zones. The mixture may for example be included in the gas diffusion layers 63 and 64 by impregnation. The gas diffusion layers 63 and 64 advantageously do not include the mixture in their median zone covering their reactive zone.

According to this variant, a capacitive layer may be included directly above a linking zone, without increasing the thickness of the stack at the level of this linking zone.

Figure 7:
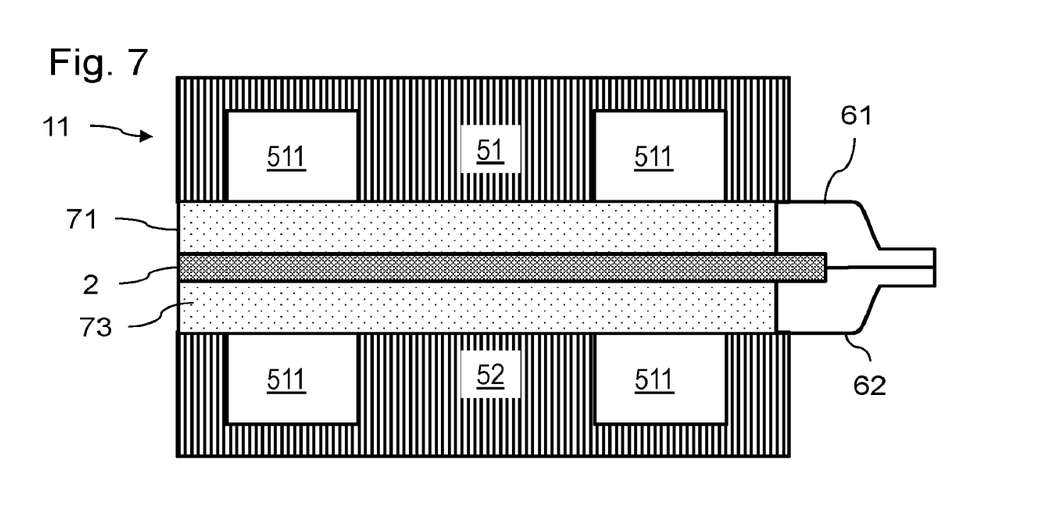
FIG. 7 is a cross-sectional view of a fuel cell including another variant of membrane/electrode assembly.

FIG. 7 is a sectional view of a cell 11 of a fuel cell, including another variant of membrane/electrode assembly 14, at the level of a lateral edge of a linking zone. The membrane/electrode assembly 14 includes the same structure of membrane 2, of anode and of cathode, of reinforcements 61 and 62 and of bipolar plates 51 and 52 as in the variant in FIG. 3. In this variant, the gas diffusion layers 63 and 64 cover the anode 31 and the cathode, respectively. In this variant, the gas diffusion layers 63 and 64 do not extend as far as the linking zones, and therefore do not cover these linking zones.

Here, the mixture of carbon and of proton conductor forms a layer, which extends continuously between the membrane 2 and their respective bipolar plate 51 or 52.

According to this variant, it is possible to avoid extending the gas diffusion layers into the linking zones.

Figure 8:
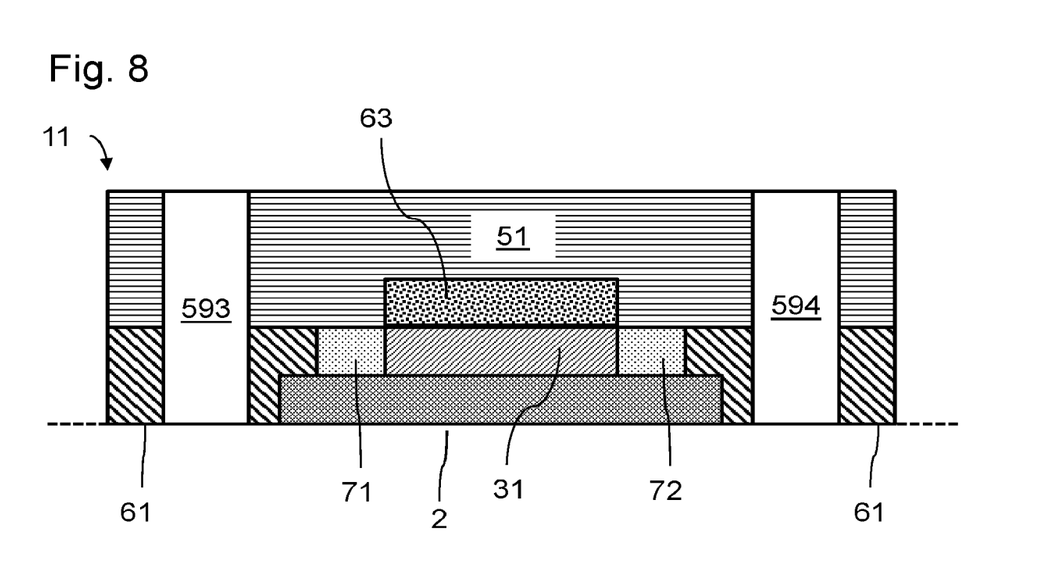
FIG. 8 is a view in longitudinal section of a fuel cell according to a variation of FIG. 6.

FIG. 8 is a view in longitudinal section of the upper part of a cell 11 according to another variation of the variant in FIG. 7. In this variation, the capacitive layers 71 and 72 have a thickness equal to that of the anode 31, and therefore less than the cumulative thickness of the anode 31 and gas diffusion layer 63. The bipolar plate 51 thus has a raised zone facing a linking zone, in order to compensate this difference in thickness.

Figure 9:
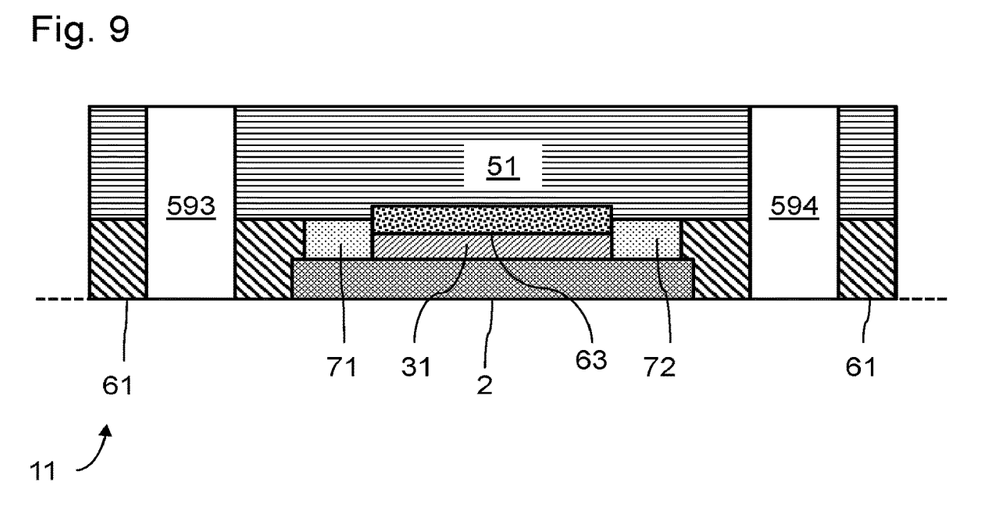
FIG. 9 is a view in longitudinal section of a fuel cell according to another variation of FIG. 6.

FIG. 9 is a view in longitudinal section of the upper part of a cell 11 according to a variation of the variant in FIG. 7. In this variation, the capacitive layers 71 and 72 have a thickness greater than that of the anode 31, but less than the cumulative thickness of the anode 31 and gas diffusion layer 63. The bipolar plate 51 thus has a raised zone facing a linking zone, in order to compensate this difference in thickness.

Although an embodiment has been described with capacitive layers in the linking zones on either side of the anode, we may also envisage only producing a capacitive layer in a linking zone on one side of the anode.

The invention claimed is:

1. A fuel cell, comprising:
   a membrane/electrode assembly, including a proton exchange membrane, and including an anode in contact with a first face of the membrane, the membrane/electrode assembly including a first active zone covered by the anode, and a first linking zone not covered by the anode;
   flow guiding plates, between which the membrane/electrode assembly is arranged, the flow guiding plates being traversed by at least one first flow collector in communication with the anode, the first linking zone arranged between the first flow collector and the first active zone;
   wherein the membrane/electrode assembly further includes a first capacitive layer including a mixture of carbon having a BET specific surface area at least equal to 200 m$^2$/g and of a proton-conducting material, arranged on the first linking zone.

2. The fuel cell as claimed in claim 1, further comprising a gas diffusion layer positioned between the anode and one of the flow guiding plates.

3. The fuel cell as claimed in claim 2, wherein the gas diffusion layer includes a portion covering the first linking zone, the portion of the gas diffusion layer including the mixture of proton-conducting material and of carbon.

4. The fuel cell as claimed in claim 2, wherein the gas diffusion layer does not cover the first linking zone, the mixture of proton-conducting material and of carbon extending continuously between the membrane and one of the flow guiding plates.

5. The fuel cell as claimed in claim 1, wherein:
   the membrane/electrode assembly includes a cathode in contact with a second face of the membrane;
   the membrane/electrode assembly includes a second active zone covered by the cathode and a second linking zone not covered by the cathode;
   the flow guiding plates are traversed by at least one second flow collector in communication with the cathode;
   the second linking zone is arranged between the second flow collector and the second active zone;
   the membrane/electrode assembly further includes a second capacitive layer including a mixture identical to that of the first capacitive layer and arranged on the second linking zone.

6. The fuel cell as claimed in claim 1, wherein the first capacitive layer has a thickness of between 10 and 150 μm.

7. The fuel cell as claimed in claim 1, wherein the first capacitive layer lacks catalyst.

8. The fuel cell as claimed in claim 1, wherein the first capacitive layer comprises a proportion by weight of the proton-conducting material of between 20 and 60%, and a proportion by weight of the carbon of between 40 and 80%.

9. The fuel cell as claimed in claim 8, wherein the first capacitive layer comprises a proportion by weight of the proton-conducting material of between 35 and 45%, and a proportion by weight of the carbon of between 45 and 55%.

10. The fuel cell as claimed in claim 1, wherein the carbon is carbon black.

11. The fuel cell as claimed in claim 1, wherein the first capacitive layer has a surface capacitance at least equal to 600 mF/cm$^2$.

12. The fuel cell as claimed in claim 1, wherein the membrane/electrode assembly further includes a reinforcing layer integral with the membrane and surrounding the first capacitive layer.

* * * * *